(12) United States Patent
van Grieken et al.

(10) Patent No.: US 8,500,366 B2
(45) Date of Patent: Aug. 6, 2013

(54) PIPELINE GUIDE ASSEMBLIES

(75) Inventors: Gerardus Cornelius van Grieken, Noordwijkerhout (NL); Maikel Hillenaar, Leiderdorp (NL)

(73) Assignee: Heerema Marine Contractors Nederland B.V., Leiden (NL)

( * ) Notice: Subject to any disclaimer, the term of this patent is extended or adjusted under 35 U.S.C. 154(b) by 178 days.

(21) Appl. No.: 12/995,495

(22) PCT Filed: Jun. 3, 2008

(86) PCT No.: PCT/NL2008/000143
§ 371 (c)(1),
(2), (4) Date: Dec. 1, 2010

(87) PCT Pub. No.: WO2009/148297
PCT Pub. Date: Dec. 10, 2009

(65) Prior Publication Data
US 2011/0081204 A1    Apr. 7, 2011

(51) Int. Cl.
*F16L 1/00* (2006.01)
*B63B 35/04* (2006.01)

(52) U.S. Cl.
USPC ................ 405/168.1; 405/166; 405/167

(58) Field of Classification Search
USPC ............... 405/166, 167, 168.1, 158
See application file for complete search history.

(56) References Cited

U.S. PATENT DOCUMENTS

| | | |
|---|---|---|
| 3,438,213 A | 4/1969 | Broussard et al. |
| 3,555,835 A | 1/1971 | Smith |
| 3,641,779 A | 2/1972 | Koop, Jr. et al. |
| 4,472,079 A | 9/1984 | Langner |
| 5,011,333 A | 4/1991 | Lanan |
| 6,273,643 B1 | 8/2001 | Baugh |
| 6,524,030 B1 | 2/2003 | Giovannini et al. |
| 2007/0098504 A1 | 5/2007 | Roodenburg et al. |

FOREIGN PATENT DOCUMENTS

| | | |
|---|---|---|
| NL | 8303483 A | 5/1985 |
| WO | 03/033953 A1 | 4/2003 |
| WO | 2007/000609 A2 | 1/2007 |
| WO | 2007/094655 A1 | 8/2007 |

OTHER PUBLICATIONS

English Abstract of NL 8303483.

*Primary Examiner* — Tara M. Pinnock
*Assistant Examiner* — Carib Oquendo
(74) *Attorney, Agent, or Firm* — Hoffmann & Baron, LLP

(57) ABSTRACT

The present invention relates to a pipeline guide assembly for a pipeline laying vessel, the pipeline guide assembly comprising:—a plurality of segments (20) pivotably interconnected via hinges (38) in an end-to-end relationship, each segment comprising at least one pipeline support (34) constructed to support a pipeline, wherein the pipeline supports provide a firing line (24) along which a pipeline can be launched,—a curvature mechanism (32) comprising at least one actuator (68, 68*a*, 68*b*, 68*c*, 68*d*), the curvature mechanism constructed for pivoting each segment relative to the next segment such that in use the segments provide a curved firing line, wherein the pipeline supports limit the curvature of the pipeline as it is launched along said curved firing line. The present invention also relates to a vessel comprising the stinger. The present invention also relates to a method of laying a pipeline utilizing the stinger of the invention.

20 Claims, 13 Drawing Sheets

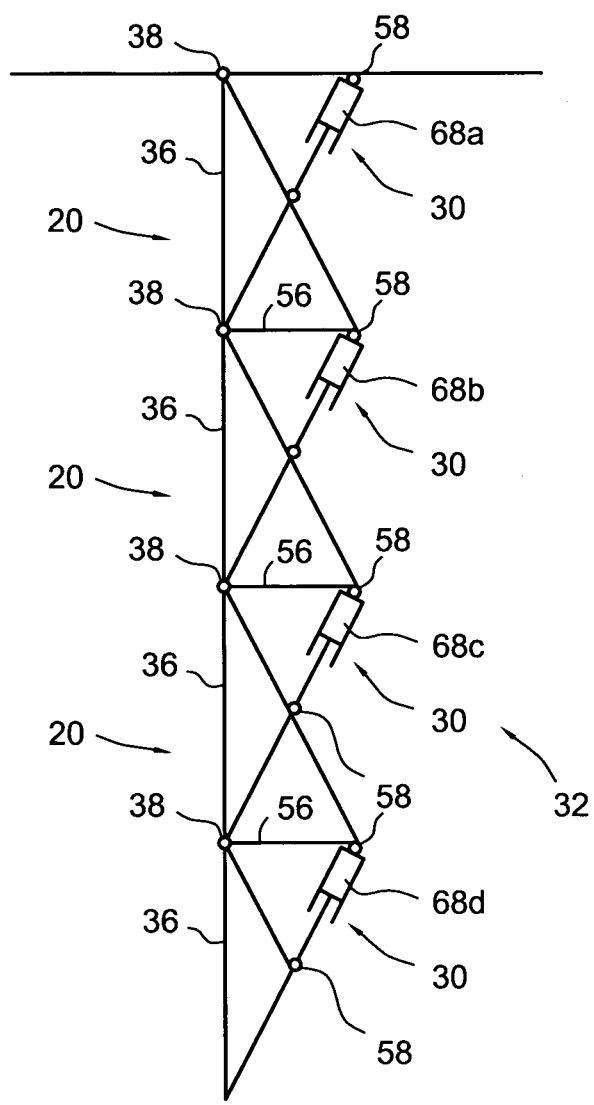
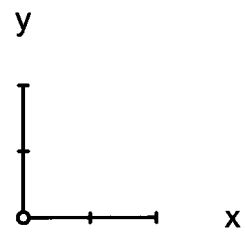
Fig. 6b
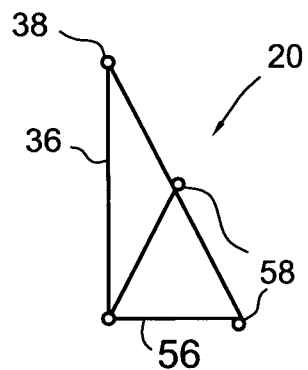
Fig. 6c
Fig. 6a

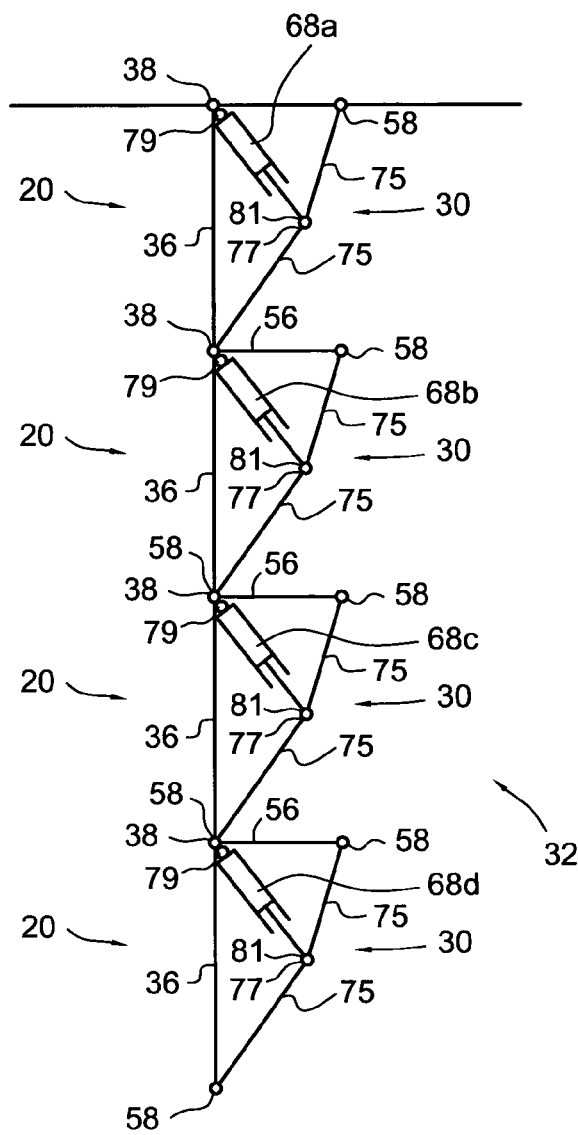
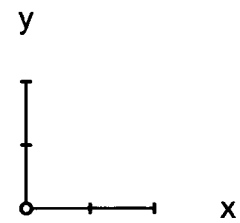
Fig. 7b
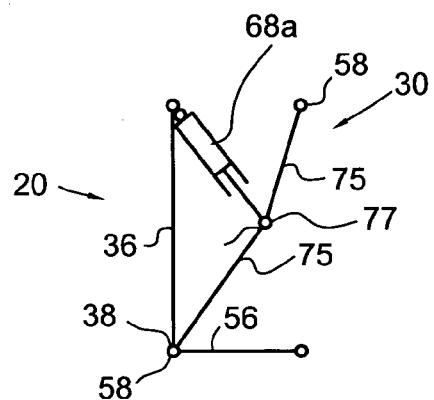
Fig. 7c
Fig. 7a

A-A

PIPELINE GUIDE ASSEMBLIES

CROSS-REFERENCE TO RELATED APPLICATIONS

This application is the National Stage of International Application No. PCT/NL2008/000143, filed Jun. 3, 2008, the contents of which is incorporated by reference herein.

FIELD OF THE INVENTION

The present invention relates to a pipeline guide assembly for a pipeline laying vessel. The present invention further relates to a pipeline laying vessel comprising such a pipeline guide assembly and to a method of laying a pipeline which uses the pipeline guide assembly.

BACKGROUND OF THE INVENTION

Such a pipeline guide assembly is often referred to as a "stinger".

In the field of the art, pipeline laying vessels are provided which are based on J-lay, S-lay, or reel-lay. These pipelaying methods are widely known. Some other variants are also used.

In these known methods, a pipeline is laid by the vessel. As the vessel moves forward, the pipeline is launched from the vessel and lowered to the seabed. Many publications are known in the field of the art on this subject.

In certain conditions, the departure angle of the pipeline directly below the vessel can be different than the angle of the firing line of the pipe lay equipment on board the vessel. This is due to the fact that the natural departure angle directly below the vessel is determined by a number of factors, such as the water depth, the stiffness of the pipeline, the axial tension in the pipeline and other factors. The angle of the pipelay equipment may be determined by other factors, such as limitations of the vessel or limitations of the pipelay equipment or by weathervaning requirements of the vessel. These factors may lead to a difference in the natural departure angle and the pipelay angle, which is the angle between the vertical and the firing line along which the pipelay equipment deploys the pipeline.

Therefore, there is a general need in the field of the art to provide a pipeline guide assembly which guides the pipeline along a curved trajectory when it is launched from the vessel equipment, in order to provide a gradual transition from the pipelay angle to the natural departure angle of the pipeline. The pipeline guide assembly limits strains and/or stresses in the pipeline, preventing overstressing or even buckling of the pipeline.

In a J-lay system, the J-lay tower is normally positioned under an angle that generally corresponds to the natural departure angle under which the pipe string will leave the J-lay tower, the natural departure angle being a function of the pipe properties, water depth and horizontal force which is exerted on the pipe by the pipelay vessel. The advantage of this method is that the pipeline does not require much support after leaving the pipelay tower, the pipe laying process does not lead to (much) additional stress and strain in the pipeline, and the horizontal force exerted on the pipeline by the pipelay vessel is small when compared with for instance the S-lay method. This offers the benefits that positioning of the pipeline on the seabed can be done more accurately, tighter curves can be made and freespans are significantly reduced.

Therefore, in a J-lay system a relatively short and thus relatively small support structure will suffice, which may be used for purposes of monitoring rather than supporting the pipeline. A disadvantage of this method is that the pipelay vessel needs to be positioned such that the J-lay tower firing line is always lined up with the pipelay route. The heading of the vessel can thus not be optimized to suit local circumstances like waves or current.

In a J-lay system, it is also possible to maintain the J-lay tower in a generally vertical position, wherein the pipe is supported between the vertical position in the tower and the natural departure angle below the tower. With this method, also known as Vertical lay or V-lay, the heading of the pipelay vessel is no longer dictated by the pipeline route, but can be chosen such that the vessel propulsion and station keeping system can be utilized in the most suitable way for encountered circumstances, for instance waves or current.

A disadvantage of this method is that the pipeline needs to be supported over a larger distance in order to bridge the angle between the vertical construction angle and the natural departure angle. Further a strong support structure is required since the horizontal component of the pipeline lay tension is transferred between the pipeline and the vessel via the stinger roller boxes instead of via the axial pipe direction through the pipe hang off system on the vessel which is the case for 'normal' J-lay.

Since the vessel can be oriented in any position, the support structure needs to be able to support the pipe in any direction over a considerable length. This may potentially lead to a very large structure.

PRIOR ART

U.S. Pat. No. 6,524,030 discloses a J-lay system, wherein rollers define a trumpet shape. An example is provided in U.S. Pat. No. 6,524,030B1, wherein a lower ramp 17 allows some bending of the pipeline.

A different embodiment is shown in FIGS. 10 through 17c of U.S. Pat. No. 6,524,030B1. Here, a lower guide arrangement 61 allows some bending of the pipeline. See also column 3, lines 16-58 of U.S. Pat. No. 6,524,030B1 and the description of FIGS. 10-17c.

The lower guide arrangement 61 of U.S. Pat. No. 6,524,030 works with adjustable roller boxes on different levels, the levels being stationary relative to each other. The pipe string runs through these roller boxes. Adjusting the diameter of the roller boxes—each roller box can be adjusted separately— will limit the amount of movement the pipe string can make.

The lower guide arrangement 61 of U.S. Pat. No. 6,524,030B1 has several disadvantages. One disadvantage is that the lower guide arrangement 61 is very heavy and becomes progressively heavier towards the lower end. This is related to the trumpet shape of the lower guide arrangement 61, see column 3, line 51 of U.S. Pat. No. 6,524,030. Due the trumpet shape, the length of the lower ramp is also limited, because the increasing weight limits the length, and the increasing diameter at the lower end makes handling increasingly difficult.

The adjustable roller boxes of U.S. Pat. No. 6,524,030 are large and heavy, especially when they have to suit large diameter ranges, which are needed to manipulate pipe strings over large distances or in large angles. The rollerboxes are smaller near the upper end of the ramp and increase in size further down. The radius of the bend that is allowable for a pipeline is a function of the pipe diameter. Large diameter pipes need to bend over a larger radius in order to keep strain levels within allowable values.

The maximum angular deflection that can be supported by the construction determines the minimum water depth in which pipes can be laid and depends on the length of the stinger and the allowed radius. Therefore extremely large and heavy stingers are required in the system of U.S. Pat. No. 6,524,030 to generate large deflections for large diameter pipes. For greater diameters, U.S. Pat. No. 6,524,030 only allows limited bending. See also column 4, line 27 of U.S. Pat. No. 6,524,030. The limited amount of bending necessitates that under most operating conditions, the tower 14 is to be angled forward, as is disclosed in U.S. Pat. No. 6,524,030

Another disadvantage of the lower ramp of U.S. Pat. No. 6,524,030 is the limited amount of control. The bending can only be controlled by varying the pivot angle of the tower 14. The difference between the angle of the tower and the natural angle of the pipeline under water determines the amount of bending in the pipeline guide assembly. Although sensors are provided on the lower ramp, the sensors allow for measurement of the situation, but do not allow any influencing of the bending, apart from varying the angle of the tower.

U.S. Pat. No. 4,472,079 discloses a stinger comprising segments which are interconnected by flexible joints. This is a fairly primitive design. A drawback of this system is that the control of the bending of the pipeline is very limited.

Other devices are disclosed in U.S. Pat. No. 3,641,779, WO2007/000609, US2007098504, WO2003/033953 and U.S. Pat. No. 5,011,333.

OBJECT OF THE INVENTION

It is an object of the invention to provide a pipeline guide assembly which resolves at least one of the above mentioned problems and drawbacks of known stingers.

It is an object of the invention to provide a lighter pipeline guide assembly.

It is an object of the invention to provide a longer pipeline guide assembly.

It is another object of the invention to provide a pipeline guide assembly which provides a substantially greater total curvature of the pipeline than known pipeline guide assemblies.

It is another object of the invention to provide a pipeline guide assembly which allows better control of the curving of the pipeline.

It is another object of the invention to provide a pipeline guide assembly which can be provided on a J-lay vessel and which allows a J-lay tower to be positioned vertically in most or all pipeline laying conditions.

SUMMARY OF THE INVENTION

In order to achieve at least one of these objects, the invention provides a pipeline guide assembly for a pipeline laying vessel, the pipeline guide assembly comprising:

a plurality of segments pivotably interconnected via hinges in an end-to-end relationship, each segment comprising at least one pipeline support constructed to support a pipeline, wherein the pipeline supports provide a firing line along which a pipeline can be launched, a curvature mechanism comprising at least one actuator, the curvature mechanism constructed for pivoting each segment relative to the next segment such that in use the segments provide a curved firing line, wherein the pipeline supports limit the curvature of the pipeline.

The pipeline guide assembly provides a controlled curve of the pipe. The stinger may be mounted to a pipeline laying vessel, such as a J-lay, S-lay, G-lay or reel-lay vessel.

Generally, the curvature will be imparted on the pipeline as it is launched along said firing line. The pipeline is straight when formed on board the pipelay vessel. As the pipeline extends downwards, a curvature is imposed on the pipeline in order to bridge any difference between the natural departure angle and the angle of the pipe lay equipment. This difference in angles may lead to buckling of the pipeline. The pipeline guide assembly provides a controlled curvature, preventing buckling of the pipeline.

The pipeline can be constructed on board of the vessel by joining pipe sections or multi-joints. The orientation in which the pipe sections are added to the pipeline can be horizontal (which method is known in the art as S-lay), non-horizontal in a tower (which method known in the art as J-lay), or vertical (which method known in the art as V-lay). Other known methods such as reel lay may also use the present invention.

The curvature of the stinger is adjustable and may be controlled as a process parameter of the pipelay operation. The actuator of the curvature mechanism allows an active adjustment of the curvature over larger angles than systems known from the art. In use, the curved trajectory of the firing line and hence of the pipeline is defined by the curvature of the pipeline guide assembly.

In an exemplary embodiment, the curvature is substantially uniform along the pipeline guide assembly.

The pivotal segments result in a light construction. The pivotable segments further result in a pipeline guide assembly that may have a long length without excessive weight. A bending moment may be induced into the pipeline by the subsequent segments.

The pipeline guide assembly does not have a trumpet shape as the prior art shows. This means that an increase in the length of the stinger does not lead to a sharp increase in weight, but in a moderate increase of weight.

Further, because the stinger can be made longer with limited weight, the longer length results in a greater maximum bending angle of the pipeline, thereby allowing pipelay operations to commence in shallower water than a known stinger would.

The greater maximum bending angle of the pipeline results in the possibility of angling the tower of the pipeline laying vessel vertically upwards under all or almost all pipelay conditions. In contrast with the J-lay tower of U.S. Pat. No. 6,524,030, there is no need to angle the tower forward under normal pipelaying conditions. Apart from that, the pipeline guide assembly of the invention is a more elegant and lightweight construction that the ramp disclosed in U.S. Pat. No. 6,524,030.

In a suitable embodiment, the present invention results in a pipelay vessel that does not have a preferred or intended direction of movement, but is omni-directional. A pipeline can be laid with the hull of the vessel oriented in any direction relative to the direction of movement, i.e. the direction in which the pipeline is laid. In any orientation of the hull relative to the direction of movement, the tower can be angled vertically.

The supports in the segments define the firing line. Some lateral freedom of movement may be provided to the pipeline. To this end, the supports may define openings which are somewhat larger than the outer diameter of the pipeline.

Each segment may have one or more supports. The supports may comprise rollers. Each support may comprise an opening for allowing the pipeline to be laterally removed from the support. The opening may be provided with a lid or door structure to open or close the opening as desired. In the closed position, the support may completely surround the pipeline. In the open position, the pipeline may move laterally through the opening. This allows the pipeline guide assembly to be retracted. The pipeline guide assembly may have an inactive position remote from the firing line. When the stinger is used in J-lay, the direction of movement of the pipeline laying vessel may be such that the tower is on the rear end of the vessel. The tower may be positioned in the natural angle of the pipeline. In this angle, no pipeline guide assembly may be necessary, allowing the stinger to be retracted to a remote position.

In use, the pipeline guide assembly limits the curvature of the pipeline. The pipeline is under axial tension, and is pressed against the supports on the inner side of the curvature that is defined by the pipeline guide assembly. Thus, the pipeline guide assembly prevents the pipeline from buckling.

In a suitable embodiment, the pipeline guide assembly is able to enforce a curvature to the pipeline in two different planes which extend at right angles to one another. This allows curving of the pipeline in two dimensions. This allows for the pipeline to be directed at any point, when viewed in the direction of the firing line.

In a suitable embodiment, the pipeline guide assembly according to the invention creates a possibility to weathervane the vessel in a suitable direction for reducing loads from wind and waves on the vessel. At the same time the pipeline guide assembly supports the pipeline from the angle of the pipelay equipment to the natural angle of the pipeline.

The current invention relates to a segmented stinger that allows the pipe string to curve along extreme angles and shapes, whereby the pipeline guide assembly is sufficiently strong. However, the stinger can still be considerably smaller and lighter than is the case in stingers known from the art. This is achieved by making the stinger from multiple segments that can be moved relative to each other to create the required bend radius or shape.

The segmented stinger comprises multiple roller boxes. The design is based on the maximum outer pipeline diameter, plus some extra space to ensure passage of thick coating/collars/anodes/etc. These roller boxes are therefore compact and light.

The main structure of the pipeline guide assembly of the invention is a segmented "backbone". The backbone may be embodied by a single beam or by a truss or a strut. Each pipeline support of the segments may be embodied as a roller box. Preferably, two roller boxes are provided per segment. The segments are coupled together by means of a hinge system such as a cardan joint or a gimbal. This hinge system accommodates the segments to hinge freely about two axes relative to one another. This allows the stinger to be adjusted to any side of the vessel.

The segmented stinger can be outfitted with several actuating systems in order to adjust the curvature and induce the curvature on the pipeline.

In another embodiment, adjustment per segment is possible whereby each segment is separately and independently controlled by its own dedicated adjustment system, for instance comprising: adjustment by means of hydraulic cylinder, adjustment by means of spindle, adjustment by means of rack and pinion, adjustment by means of spring system (no moving parts).

An advantage of this embodiment is that the shape of the segmented stinger is very flexible. All kinds of shapes can be obtained by adjusting each segment separately. Examples of curves that can be obtained with this system include amongst others J-shapes, S-shapes and combined S-shapes.

Preferably, each segment comprises a main axis extending between a first hinge on one end of the segment and a second hinge on the second end of the segment, wherein the curvature mechanism comprises a connection assembly extending between a first connection point on a first segment and a second connection point on a second segment, wherein:

a) the first connection point is offset from the main axis of said first segment, and/or b) the second connection point is offset from the main axis of said second segment, and wherein the connection assembly is operable via the at least one actuator such that the first and second connection points are moved toward one another or away from one another, thereby pivoting the second segment relative to the first segment, the third segment relative to the second segment, and so forth.

The connection assembly provides a simple way of controlling the curvature of the segments.

Preferably, the length of the connection assembly is variable via the at least one actuator. The distance between the first and second connection points may be simply controlled by varying the length of the connection assembly, for instance via a hydraulic cylinder. Other means are also possible.

In a preferred embodiment, each segment comprises a main beam extending between a first hinge and a second hinge provided on either end of said main beam, wherein each segment comprises at least one offset beam projecting substantially laterally from the main beam, wherein said curvature mechanism is connected to said at least one offset beam at a connection point which is offset from the main axis defined between said first and second hinge.

Preferably, both the first and second connection point are offset from the main axis of the segment. This construction allows the support of the pipeline with relative little force. As the distance at which the first and second connection points are offset from the main axis increase, the required force becomes smaller. This is due to the fact that the induced moment in the pipeline is equal to the force multiplied by the offset distance. As the offset distance increase, the required force decrease.

Preferably, a single actuator is provided at an end of the pipeline guide assembly which is to be connected to the vessel, and all segments are pivotable relative to one another via the single actuator.

A single (primary) actuating device at one end of segmented stinger near the vessel may be combined in combination with a curvature mechanism that transfers the actuating signal or force provided by the single actuator from each segment to the next segment until the end of the pipeline guide assembly.

The actuating device may comprise: adjustment by means of hydraulic cylinders, adjustment by means of spindles, adjustment by means of a rack and pinion, adjustment by means of a spring system. This option has the advantage of obviating any moving parts in the actuating system.

This embodiment allows a simple construction of the pipeline guide assembly. Only one control has to be adjusted. The actuator may be positioned above the water line where it can be easily inspected and maintained. No actuators are necessary below the water line.

Preferably, the curvature mechanism comprises a plurality of connection assemblies which are constructed to transfer an actuating operation of an actuator from a first connection assembly to a next connection assembly, thereby allowing an actuating operation of the actuator to progress along substantially the entire pipeline guide assembly.

This method allows the use of a single actuator which pivots each segment relative to the previous segment.

In an exemplary embodiment, the curvature mechanism comprises a plurality of actuators, allowing individual control of the pivoting of respective segments relative to one another.

This configuration allows a great control of the exact form of the curvature. An S-form, an increasing or decreasing curve radius is advantageously possible. Also, one part of the pipeline guide assembly may be kept straight while another part is curved.

Preferably, the segments are pivotable relative to one another in a first plane and in a second plane, the first and second pivot plane being oriented at right angles to one another, such that the firing line can be curved in two independent planes. To this end, the pipeline guide assembly may comprise a first curvature mechanism for curving the pipeline guide assembly in the first plane and a separate second curvature mechanism for curving the stinger in the second plane, the first and second curvature mechanism being operable independently from one another.

This construction allows full control of the curvature. When viewed in the direction of the firing line, the pipeline may be directed at any point in space, provided that the curvature does not exceed the limits of the pipeline guide assembly.

A similar result may be obtained with a curvature device which allows curving in a single plane in combination with a rotational connection between the pipeline guide assembly and the vessel. This allows the plane of rotation to be rotated relative to the vessel, allowing the pipeline also to be directed at any point in space, when viewed along the firing line.

In one embodiment, a connection assembly between adjacent segments comprises a trapezoidal shape, said trapezoidal shape being connected to the first connection point on a first segment and to the second connection point on a second segment, wherein the actuator is constructed and arranged to vary the form of the at least one trapezoidal shape, such that the first and second connection point are moved away from one another or are moved toward one another.

This embodiment allows pivoting one segment relative to another segment with simple mechanical means.

In one embodiment, a plurality of trapezoidal forms are provided, wherein said trapezoidal forms are interconnected such that a deformation of a first trapezoidal form results in a deformation of a second, adjacent trapezoidal form, and wherein a deformation of the second trapezoidal form results in a deformation of a third trapezoidal form, and so forth, thereby pivoting the second segment relative to the first segment, the third segment relative to the second segment, and so forth.

In a suitable embodiment, the actuator comprises an electrical drive, a hydraulic system, a pneumatic system, one or more spindles, a rack and pinion and/or of a spring system. These options are reliable and simple systems.

In a suitable embodiment, said main beam and offset beam are embodied as a strut and/or a truss. These are mechanical alternatives to a beam which may perform the same function with the same result.

In a suitable embodiment, each connection assembly comprises:
- a rocker beam pivotably connected to the connection point;
- two link beams, each link beam pivotably connected at one end to the rocker beam and pivotably connected at the opposite end to a rocker beam of a next segment, wherein the two rocker beams and the two link beams form a trapezoidal shape, and wherein a pivoting of a rocker beam of a first segment results in:
  a) a pivoting movement of the rocker beam of a next segment and
  b) in a relative movement of the connection point of the first segment and the connection point of the next segment, thereby pivoting the next segment relative to the first segment.

This embodiment allows simple adjustment of the curvature via the link beams and rocker beams which are connected to the connection points.

The shape of the curvature that is obtained is prescribed by the geometry of the segmented stinger structure. The shape and size of the main segments, link beams and rocker beams determine the shape that is created.

The invention also relates to a vessel comprising the pipeline guide assembly according to the invention. The vessel generally comprises a hull, a deck and a firing line along which the pipeline is launched from the vessel.

In one embodiment, the pipeline guide assembly is connected to the vessel via a rotational connection which is configured to allow rotation of the pipeline guide assembly about the firing line. This allows the plane in which the pipeline guide assembly curves to be rotated, allowing the firing line to be pointed at any point in space, provided the curvature does not exceed the limits of the pipeline guide assembly.

The invention further relates to a method of laying a pipeline, the method comprising:
  providing a pipeline laying vessel comprising a pipeline guide assembly comprising a:
    a plurality of segments pivotably interconnected via hinges in an end-to-end relationship, each segment comprising at least one pipeline support constructed to support a pipeline, wherein the pipeline supports provide a firing line along which a pipeline can be launched,
    a curvature mechanism comprising at least one actuator, the curvature mechanism constructed for pivoting each segment relative to the next segment such that in use the segments provide a substantially curved firing line, wherein the pipeline supports limit the curvature of the pipeline,
  actuating the curvature mechanism with the at least one actuator in order to provide a curved firing line,
  launching a pipeline from the vessel, wherein the curvature of the pipeline along the guide assembly is controlled by the curved firing line.

In a suitable embodiment, during the laying of the pipeline a central longitudinal plane of the pipeline laying vessel is oriented at an angle to the direction of the pipeline trajectory, the angle being substantially different than 0 or 180 degrees. This provides the benefit that the vessel can be weathervaned in order to reduce loads on the vessel by wind and waves.

The claims and advantages will be more readily appreciated as the same becomes better understood by reference to the following detailed description and considered in connection with the accompanying drawings in which like reference symbols designate like parts, or parts with the same or similar function.

BRIEF DESCRIPTION OF THE FIGURES

FIG. 6a shows a side view of the another embodiment of the pipeline guide assembly of the invention;

FIG. 6b shows a diagrammatic top view of the pipeline guide assembly of the invention with a curvature mechanism configured to allow the stinger to curve in two planes;

FIG. 6c shows a diagrammatic view of a segment;

FIG. 7a shows a diagrammatic side view of another embodiment of the pipeline guide assembly of the invention;

FIG. 7b shows a top view of FIG. 7a;

FIG. 7c shows a view of a segment;

DETAILED DESCRIPTION OF THE INVENTION

Figures 1A, 1B:
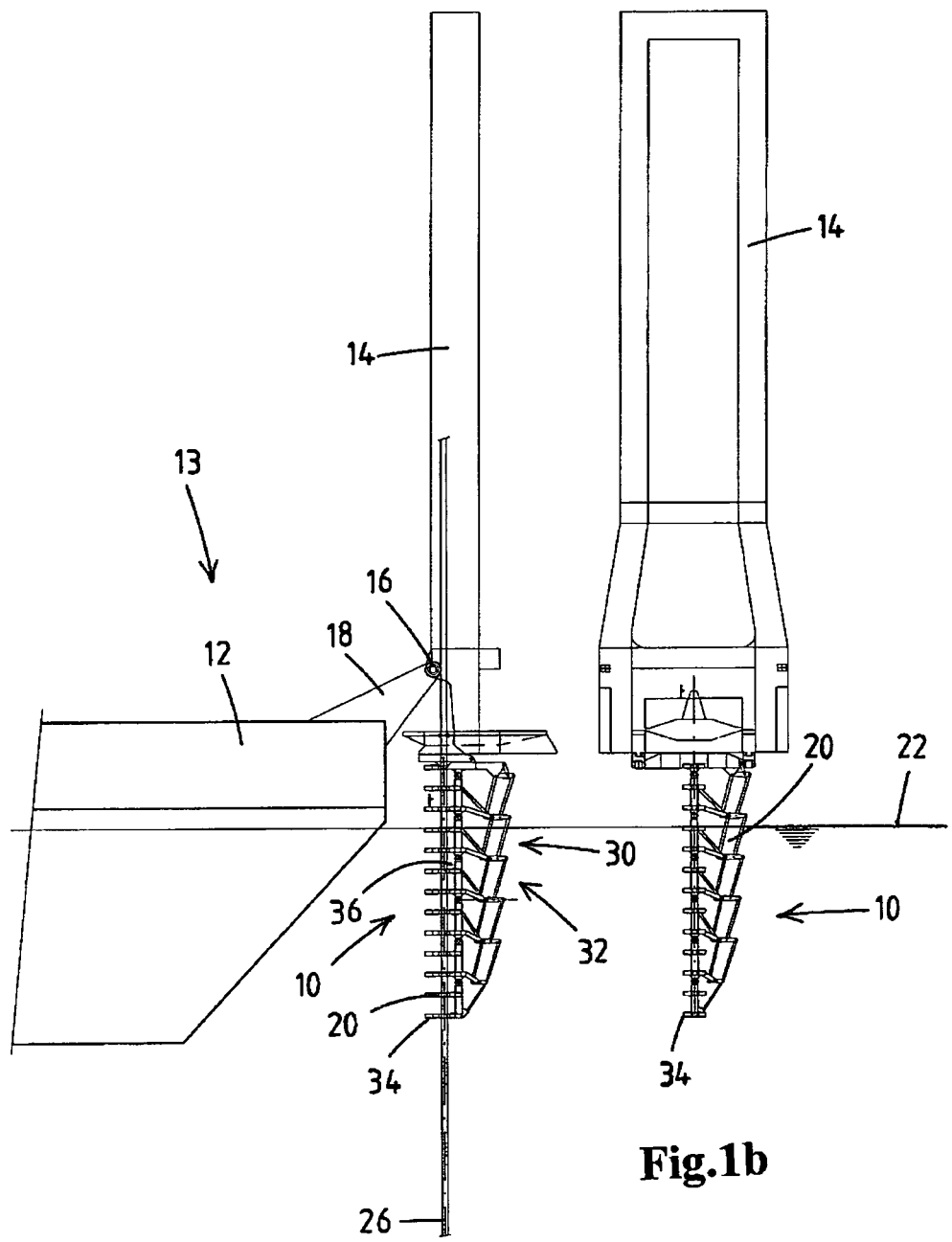
FIG. 1a shows a side view of a pipeline laying vessel comprising the pipeline guide assembly of the invention.
FIG. 1b shows a rear view of a J-lay tower with the pipeline guide assembly of the present invention.

Turning to FIGS. 1a, 1b, 2a, 2b, 3 and 4, a pipeline guide assembly 10 according to the invention is shown. The pipeline guide assembly 10 is mounted to a J-lay tower 14 which is connected to the hull 12 of the vessel 13. The J-lay tower may be mounted to the rear end or the forward end of the vessel, or to the side of the vessel. The J-lay tower may also be positioned above a moonpool or in a slot or recess in the hull of the vessel 12. It is also possible that the pipeline guide assembly 10 is connected directly to the hull 12 of the vessel 13, instead of via the J-lay tower 14.

The J-lay tower 14 and the pipeline guide assembly 10 define a firing line 24, along which a pipeline 26 (or pipe string) is launched from the vessel 13.

In the shown embodiment, the J-lay tower 14 is connected to the hull 12 via a hinge 16 and an arm 18. The J-lay tower may be of any design known in the field of the art.

The pipeline guide assembly 10 may also be used in S-lay, V-lay, reel-lay or any other kind of laying a pipeline from a pipe lay vessel.

The pipeline guide assembly 10 extends partly above the water line 22 and partly below the water line 22. The pipeline guide assembly 10 comprises 6 segments 20. A different number of segments is also possible. Each segment comprises two roller boxes 34 or similar devices. Each roller box 34 defines a space through which the pipeline 26 passes as it is launched. The roller box 34 has lateral limits, defined by the rollers (not shown in FIGS. 1a-4). Roller boxes 34 are well known in the field of the art. Each roller box 34 has an annular shape. In a suitable embodiment, the roller box 34 defines a passage way through which the pipeline 26 is lowered.

It is possible that at least one roller box 34 of each segment is adjustable laterally in order to further improve the exact form of the firing line that is defined by the pipeline guide assembly 10. A further actuator (not shown) may be provided for this end.

The roller box may be fitted with a door or lid to open the annular form, in order to allow the pipeline 26 to be laterally removed from the roller box 34, or to allow the pipeline guide assembly to be retracted to a non-active position.

Figure 3:
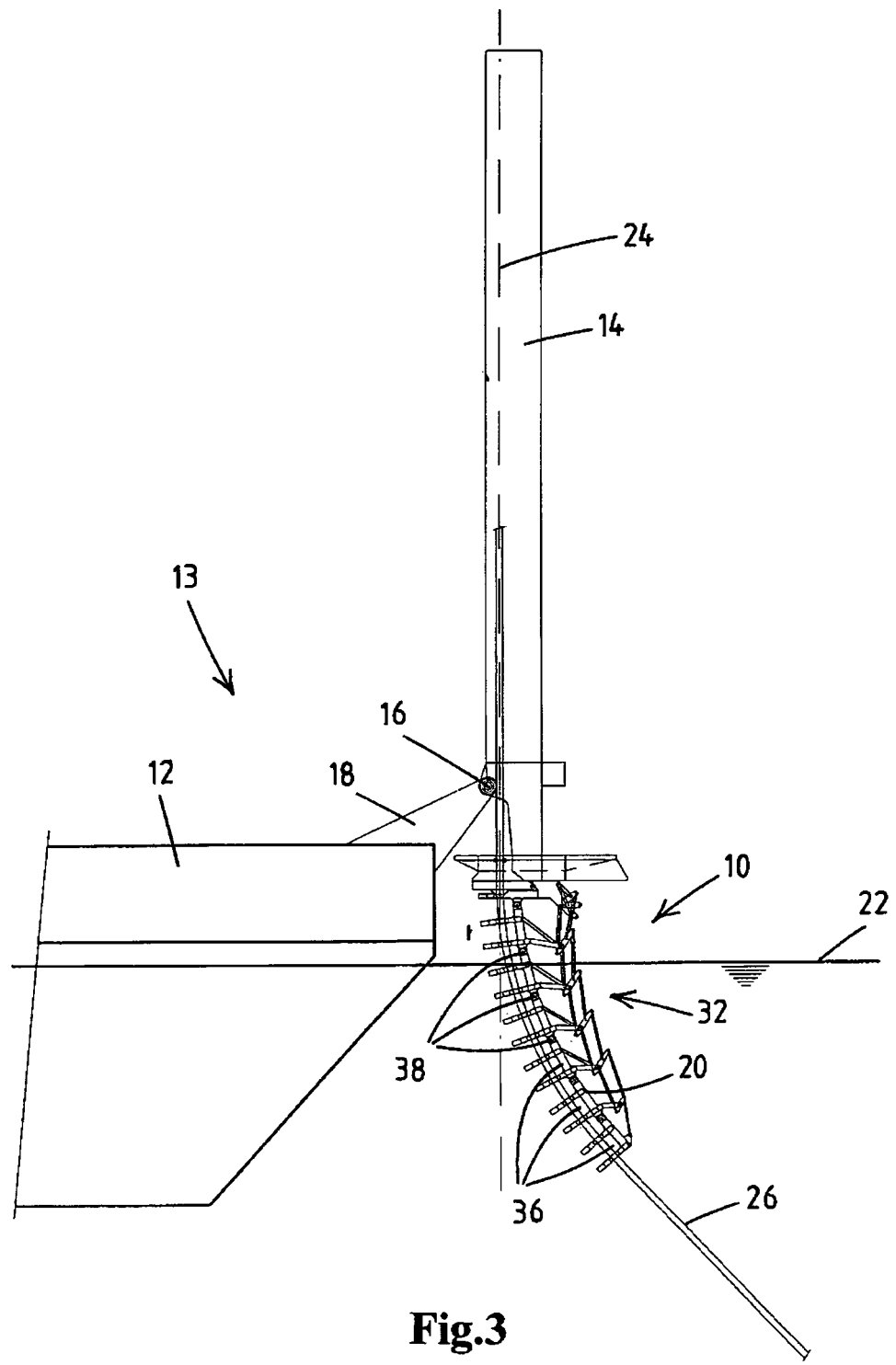
FIG. 3 shows a side view of the pipeline guide assembly in another curved state.
Figure 4:
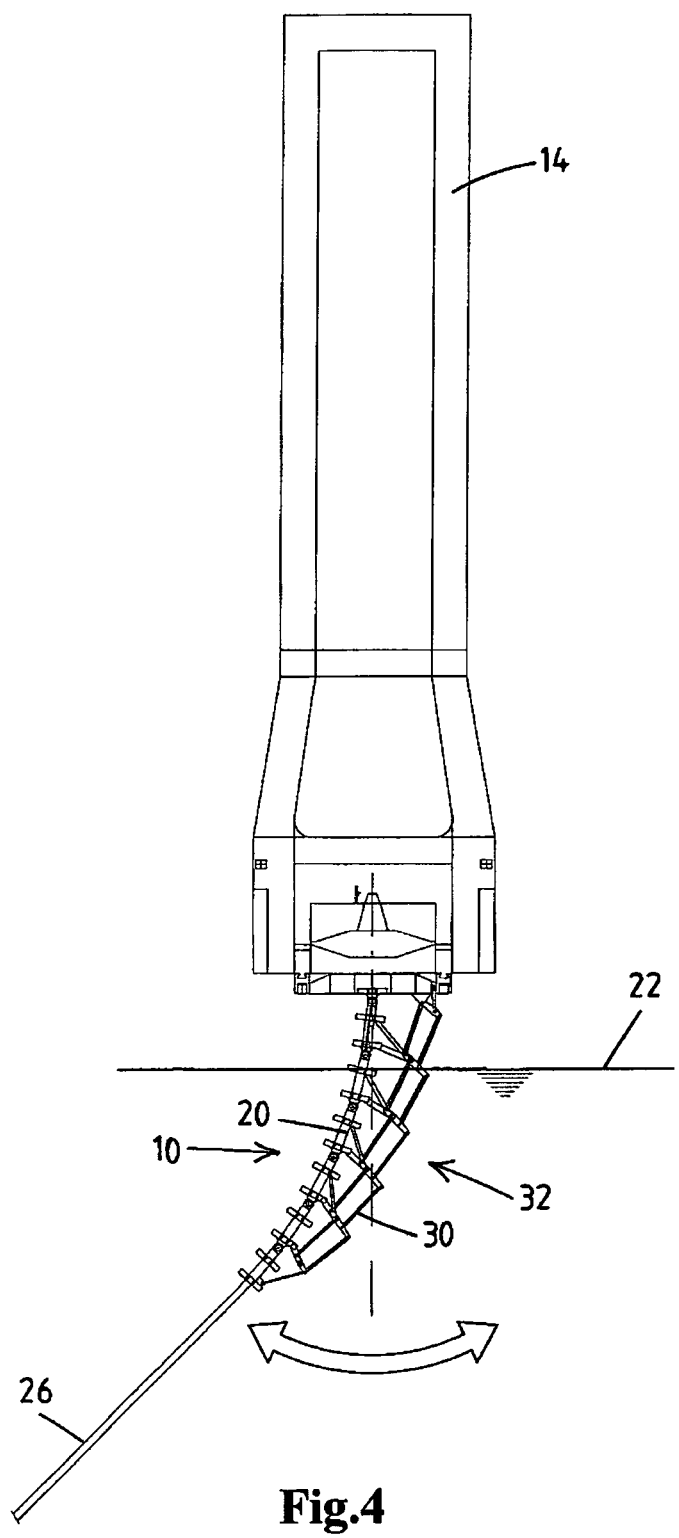
FIG. 4 shows a rear view of the pipeline guide assembly curved to the side.

Each segment 20 comprises a main beam 36. The main beam 36 is provided with a hinge 38 at both the upper end 40 and lower end 42 of the main beam 36. The main beams 36 are connected to one another via the hinges 38. The hinges 38 may be cardan hinges or another kind of hinge. The hinge allows the beams to pivot relative to one another. The hinges 38 are provided at the upper and lower ends 40, 42 of the beams 36. The segment 20 at the lower end 54 of the pipeline guide assembly 10 only has a hinge 38 at the upper end 40, but not at the lower end 42. Adjacent main beams 36 can pivot via the hinges 38 in two planes. In FIG. 3 it is shown that the pipeline guide assembly 10 curves in one plane, whereas FIG. 4 shows that the pipeline guide assembly can curve in a second plane which is oriented perpendicular to the first plane.

Each segment 20 is connected to the next segment:
1) via the hinge 38, and
2) via a connection assembly 30.

The combined connection assemblies 30 form a curvature mechanism 32. The embodiment of FIGS. 1a, 1b, 2a, 2b, 3 and 4 comprises at least one curvature mechanism, for curving the pipeline guide assembly in at least one plane. The embodiment of FIGS. 1a, 1b, 2a, 2b, 3 and 4 may also comprises two curvature mechanisms 32, for allowing the pipeline guide assembly to be curved in two planes which extend at right angles to one another. With two curvature mechanisms, the pipeline guide assembly can be curved in one plane as is shown in FIG. 3 and in a second plane as is shown in FIG. 4.

The details of the curvature mechanism 32 and the connection assemblies 30 will be further discussed in relation to FIGS. 5-7c.

Figure 2A:
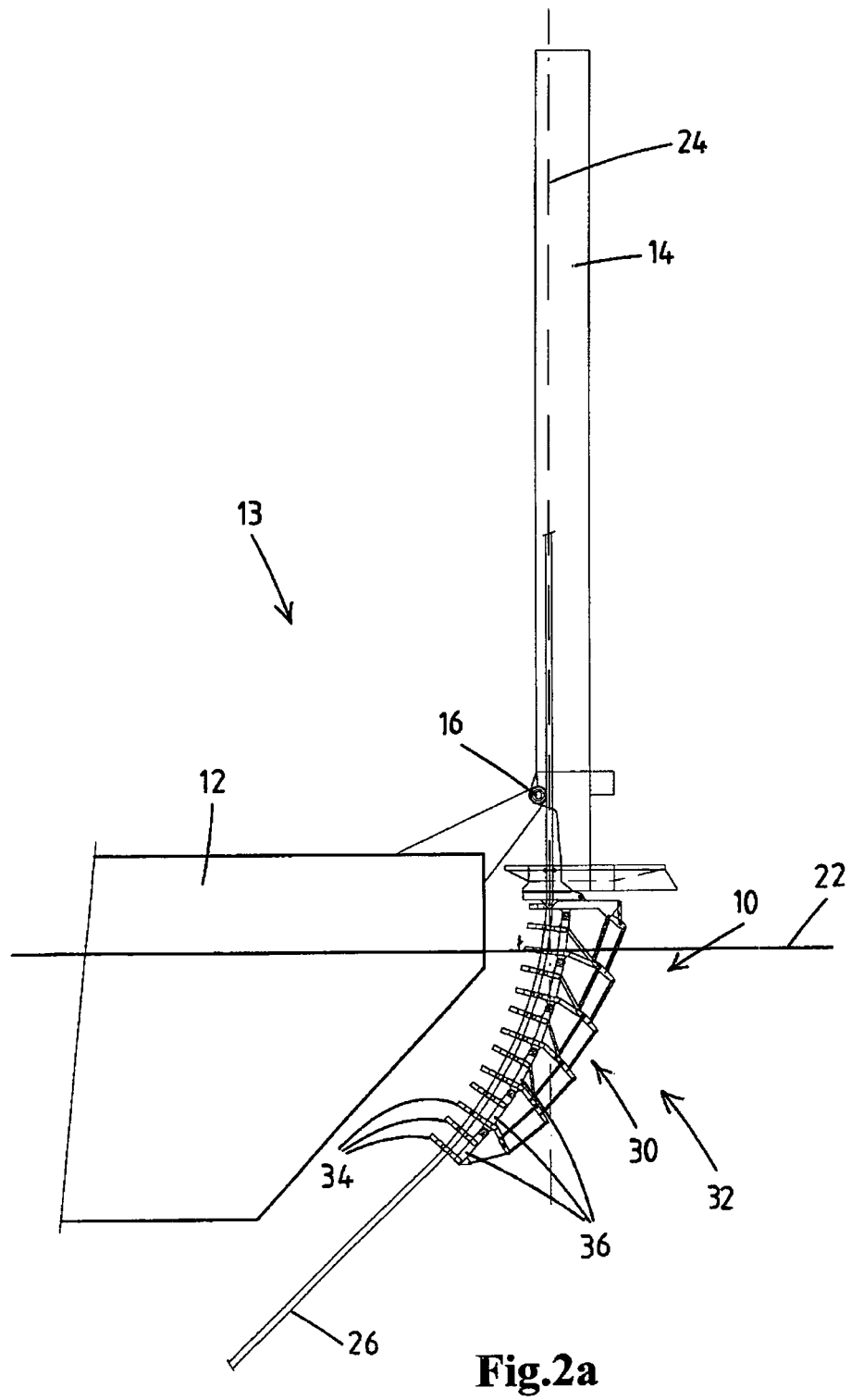
FIG. 2a shows a side view of the pipeline guide assembly in a curved state.
Figure 2B:
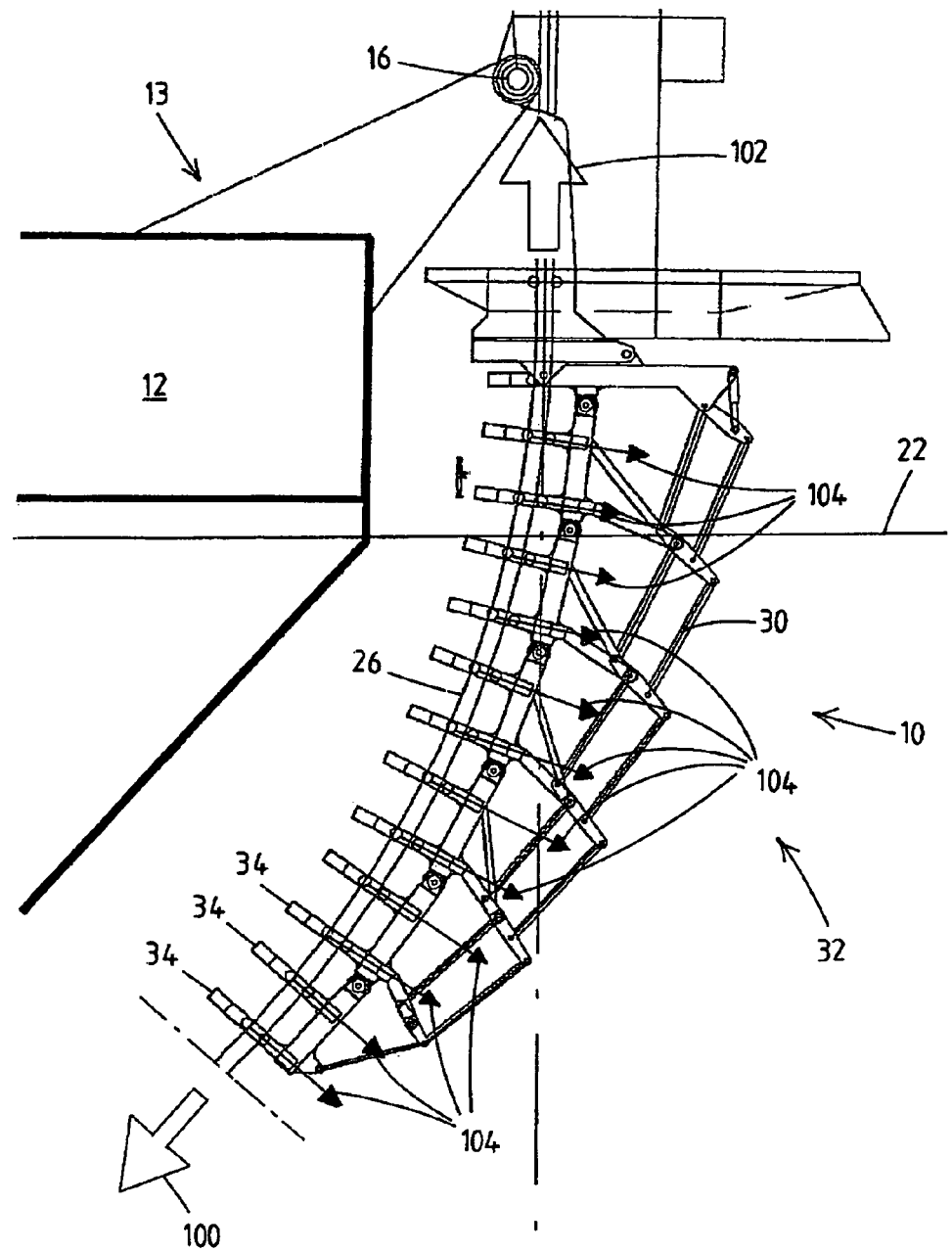
FIG. 2b shows a detailed side view of the pipeline guide assembly in a curved state with acting forces.

FIG. 2b shows the forces acting on the pipeline 26. The pipeline 26 is under axial tension by forces 100, 102. The force 100 is created by the weight of the suspended pipeline 26 and the thrust of the vessel 13. The thrust of the vessel is required to control the bending of the pipeline near the seabed. The force 102 is exerted on the pipeline 26 via the hang-off table or hang-of clamp, or via one or more tensioners. The forces 100 and 102 are not in line with one another but are angled relative to one another. In order to create equilibrium, the supports 34 of the pipeline guide assembly 10 each exert a force 104 upon the pipeline 26. The forces 104 are exerted by the supports 34 which are located on the inner side of the curvature that is defined by the supports 34. The supports press against the outer wall of the pipeline via rollers.

Figure 5:
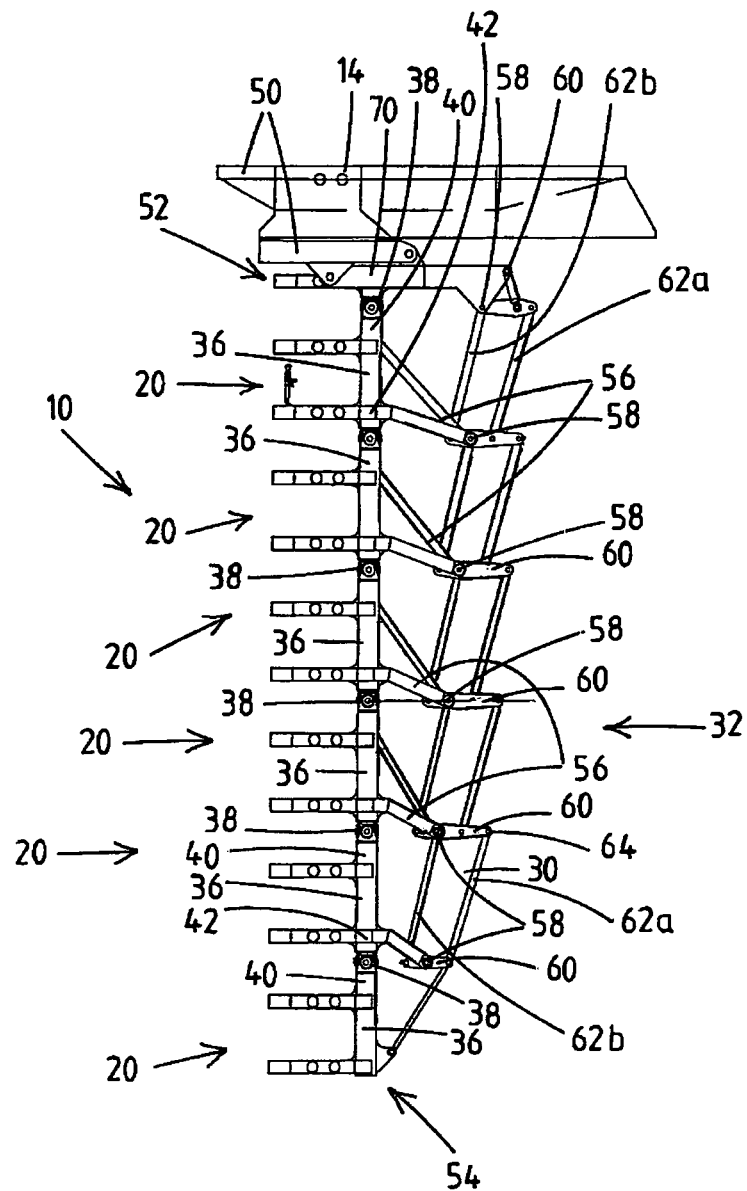
FIG. 5 shows a detailed side view of the pipeline guide assembly of the invention.

Thus, in use, the pipeline guide assembly 10 limits the curvature of the pipeline 26 and prevents the pipeline 26 from buckling. Without the pipeline guide assembly 10, the pipeline 26 would buckle directly below the hang off means under influence of the horizontally oriented vessel thrust. Turning to FIG. 5, the pipeline guide assembly 10 is connected at the upper end 52 of the pipeline guide assembly 10 to the J-lay tower via a rail 50. The rail 50 allows the pipeline guide assembly to be moved away from the firing line 24.

The roller boxes 39 are mounted to the main beam 36.

Each segment comprises an offset beam 56. The offset beams 56 are mounted fixedly to the respective main beams 36.

The curvature mechanism 32 comprises a number of connection assemblies 30, each connection assembly 30 connecting two segments 20. This each segment 20 is connected to a next segment 20 via hinge 38 and connection assembly 30

The connection assembly 30 comprises a rocker beam 60 which is connected to each offset beam 56 via a hinge 58.

The rocker beams 60 are connected to one another via two link beams 62A, 62B. The link beams 62A, 62B are connected to the rocker beams 60 via hinges 64.

A primary adjustment system (or actuator) 68 is provided at the upper end 52 of the pipeline guide assembly 10. The primary adjustment system 68 is connected to a bar 70 and to a first rocker beam 60 connected to said bar 70 via a hinge 58.

The adjustment system is used to regulate the magnitude of curvature. By adjusting the primary adjuster 68 at the top of the stinger, all segments 20 below will be relocated.

An advantage of this type of adjuster is that only one control has to be adjusted. A further advantage is that no moving adjustment system components need to be submerged into the sea water.

The shape of the curvature that is obtained is prescribed by the geometry of the segmented stinger structure. The shape and size of the main segments, link beams and rocker beams determine the shape that is created.

In use, the primary adjustment system 68 is constructed to pivot the first rocker beam 60 about the hinge 58. Via the link beams 62A, 62b, the second rocker beam 60 below the first rocker beam 60 is also pivoted. The first rocker beam 60, the second rocker beam 60 and the link beams 62A, 62b form a trapezoidal form, Due to the pivoting of the rocker beams 60, the trapezoidal form changes shape, and the angles at which the rocker beams 60 and the link beams 62A, 62B are oriented relative to one another change.

Due to the change in shape of the trapezoidal form, two connection points 58 of subsequent segments 20 are moved toward one another or away from one another. The change in distance between a connection point 58 of a first segment and a connection point 58 of a next segment 20 causes a segment 20 to pivot relative to the adjacent segment 20.

Returning to FIGS. 2 and 3 it is shown that if the upper rocker beam 60 pivots, all rocker beams 60 pivot, due the link beams 62A, 62B. Thus, each segment 20 is pivoted relative to the segment 20 above it, thereby causing a curvature of the complete pipeline guide assembly 10.

The primary adjustment system 68 may extend, thereby pivoting the first rocker beam 60 clockwise. Each rocker beam 60 pivots clockwise relative to the rocker beam above it.

Due to the trapezoidal form of the rocker beams 60 and the link beams 62, a curvature is imparted on the pipeline guide assembly 10, the curvature also being clockwise, as viewed in the launch direction along the firing line 24.

When in use the primary adjustment system is operated to pivot the first rocker beam 60 counterclockwise as shown in FIG. 3, each rocker beam 60 pivots counter clockwise relative to the rocker beam 60 above it. This causes each segment 20 to pivot counter clockwise relative to the segment 20 above it. Therefore, the curvature mechanism 32 is constructed to curve the pipeline guide assembly 10 in two different directions.

By equipping the pipeline guide assembly with two curvature mechanisms 32, positioned at an angle of 90 degrees relative to each other, a system is provided that allows construction of a firing line in any direction.

If in use a pipeline extends through the roller boxes 34, a curvature of the pipeline will be limited via the roller boxes 34. The combined rollers of all roller box define a minimum curvature which the pipeline has to follow. The defined path limits the amount of bending in the pipeline. Thus, buckling is prevented.

An advantage of the curvature mechanism 32 of FIG. 5 is that the pipeline guide assembly 10 can be operated via a single adjustment system 68 at the upper end of the pipeline guide assembly. There is no need for actuators below the primary adjustment system, because the link beams and the rocker beams transfer the curvature down the pipeline guide assembly 10.

Different embodiments of the curvature mechanism are also possible. The basic concept is that the segments 20 are pivotably interconnected, and that a curvature mechanism 32 causes each segment to pivot relative to the segment above it.

Turning to FIGS. 6a, 6b, 6c, 7a, 7b and 7c, the segmented stinger can be provided with several adjustment systems (or actuators). In FIG. 6a different actuators 68A, 68b, 68c, 68d are shown.

Options for the actuators 68 are: adjustment by means of hydraulic cylinder, an electric drive, a pneumatic drive, adjustment by means of spindle, adjustment by means of rack and pinion, adjustment by means of spring system (no moving parts). These options also apply to the embodiment of FIG. 5.

Adjustment per segment 20 is thus possible whereby each segment 20 is separately and independently controlled by its own dedicated adjustment system 68.

An advantage of this embodiment is that the shape of the pipeline guide assembly 10 is very flexible. Different kinds of shapes can be obtained by adjusting each segment 20 separately. Examples of curves that can be obtained with this system include amongst others J-shapes, S-shapes and combined S-shapes.

FIG. 6a, 6b, 6c show an embodiment wherein each connection assembly 30 between two segments 20 comprises an actuator 68 which moves two connection points 58 away from one another or toward one another by directly varying the length of the connection assembly 30 between these connection points 58. This embodiment allows individual control of the pivoting of each segment relative to the adjacent segment 20.

FIG. 7a, 7b, 7c show an embodiment wherein each connection assembly 30 between connection points 58 comprise two interconnected link beams 75. The link beams 75 are interconnected in an end-to-end relationship via a hinge 77. The combined link beams 75 extend between two connection points 58 of two adjacent segments 20. An actuator 68 a, 68b, 68c, 68d is provided which extends between a first point 79 on the segment 20 and a second point 81 somewhere on the link beams 75. The first point may be chosen at the hinge 38. The second point may be chosen at the hinge 77. Other locations of the first and second points 79, 81 are also possible.

In use, the distance between two connection points 58 may be varied by the actuator 68. The actuator 68 increased or decreases the distance between first point 79 and second point 81. This causes the link beams 75 to change their relative orientation, resulting in a change of distance between the two connection points 58.

The first and second connection points 58 comprise hinges for allowing the first and second segments to pivot relative to the connection assembly.

Figure 8A:
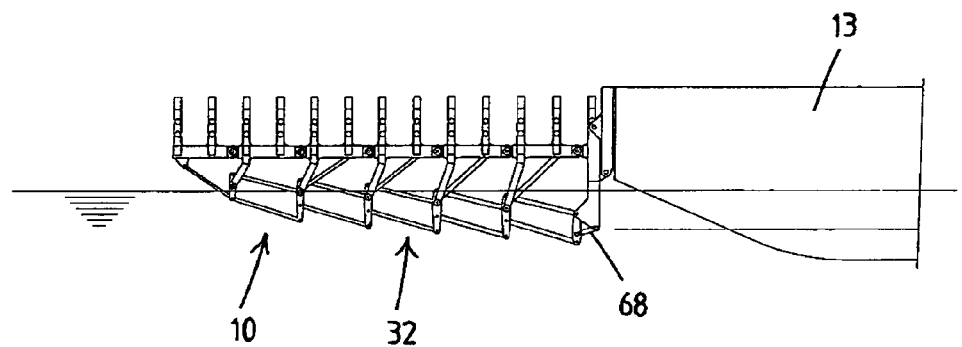
FIG. 8a shows a side view of an S-lay vessel comprising a pipeline guide assembly according to the invention.
Figure 8B:
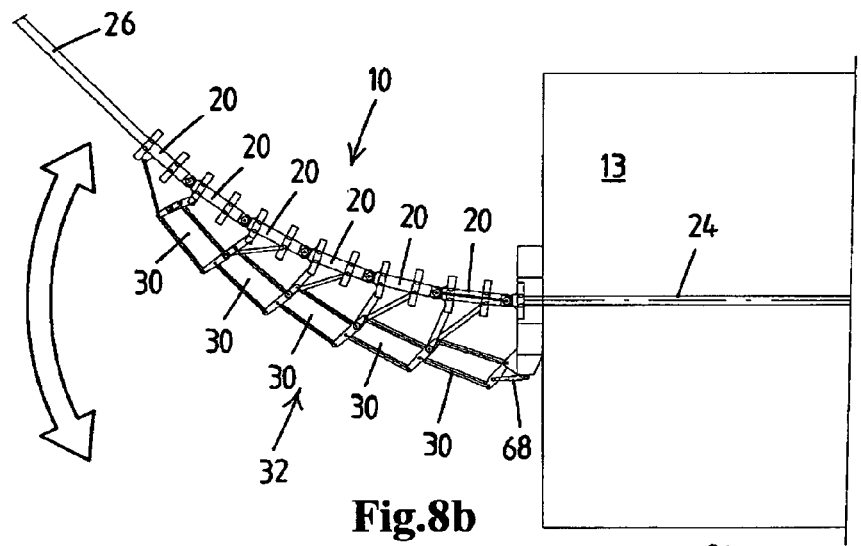
FIG. 8b shows a top view of an S-lay vessel comprising a pipeline guide assembly according to the invention, the pipeline guide assembly being curved to the side.
Figure 8C:
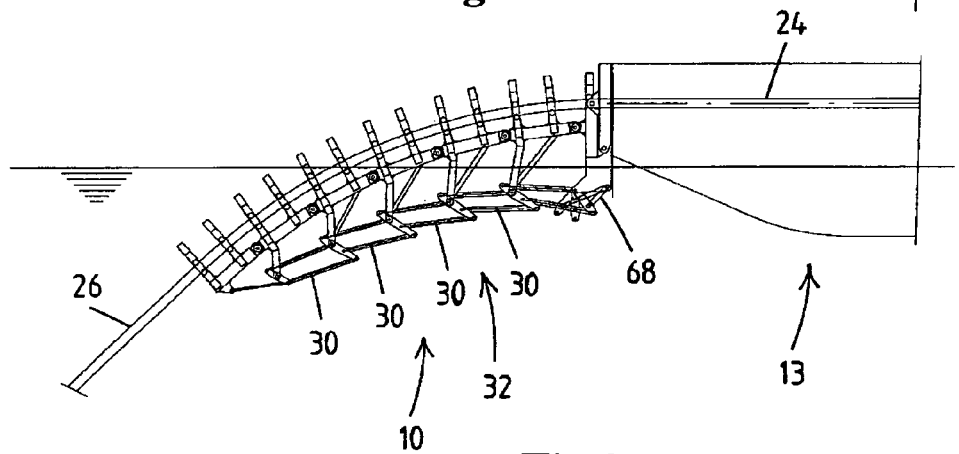
FIG. 8c shows a side view of an S-lay vessel comprising a pipeline guide assembly according to the invention, the pipeline guide assembly being curved downward.

Turning to FIG. 8a, 8b, 8c, the pipeline guide assembly 10 of the invention is shown as implemented in an S-lay system. During the laying of pipe with an S-lay system, the pipe string will leave the S-lay street in/on the vessel more or less horizontally. A pipeline guide assembly 10 can be placed where the pipe string leaves the S-lay street to limit the curvature of the pipe string 26, allowing the pipeline to bend towards the seabed without inducing unacceptable strains or stresses. This pipeline guide assembly 10 can be designed in different ways.

An S-lay stinger according to the prior art usually comprise segments which can hinge around one axis (horizontal, perpendicular to the firing line). The pipe string runs over rollers. Known systems can only curve a stinger downwards. There are situations where a possibility to curve the pipeline in two dimensions is preferred, wherein the stinger can manipulate the pipeline around the other axis simultaneously. This could be advantageous in case of contingency situations (e.g. drift offs) and to perform weather vaning with the vessel (keep another heading with the vessel than the pipe laying direction, similar to the V-lay method for J-lay vessels as described above).

When using the segmented stinger, as described on previous pages, for S-lay purposes, a similar pipeline guide assembly 10 may be mounted horizontally, in line with the S-lay pipe street (or firing line) 24. The pipeline guide assembly 10 can form any shape, so it can follow and manipulate the pipe in any desired form and thus decrease the risk of overstressing the pipe string 26.

The curvature mechanism 32 is constructed such that a first segment 20 is pivoted by the actuator 68 relative to a part of a vessel to which the first segment 20 is pivotably connected, a second segment 20 is automatically pivoted relative to the first segment 20 by the interconnected curvature mechanism 32, and a third segment 20 is automatically pivoted relative to the second segment 20 by the interconnected curvature mechanism 32, and so forth.

Figures 9A, 9B:
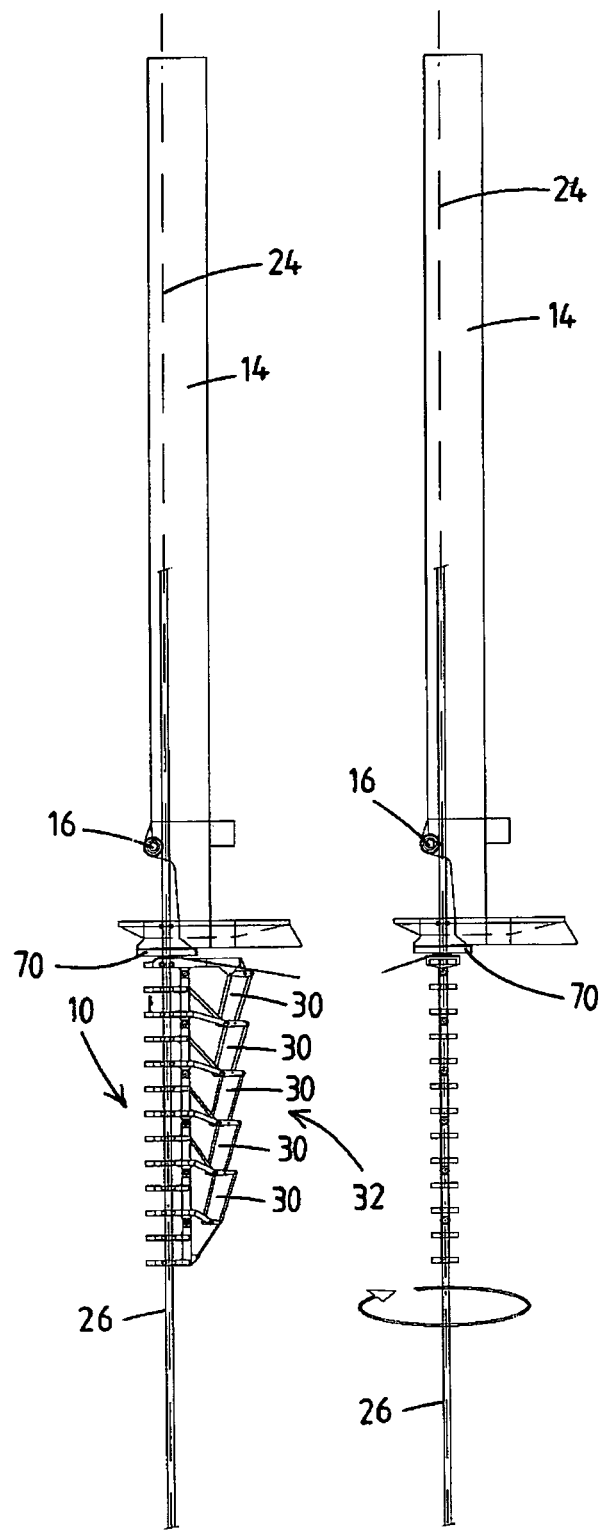
FIG. 9a shows a side view of another embodiment of the pipeline guide assembly of the invention.
FIG. 9b shows a front view of another embodiment of the pipeline guide assembly of the invention.

Turning to FIGS. 9a and 9b, a pipeline guide assembly 10 with a single curvature mechanism 32 and a rotational connection 70 is shown. In the shown embodiment, the pipeline guide assembly 10 can also be equipped with one actuating system 68, to control the curvature of the pipeline guide assembly 10 in a single plane. In this case, the segments 20 may be interconnected by means of a normal, single-axis hinge system 38. This hinge system 38 accommodates the segments 20 to hinge relative to one another about one axis.

In order to enable the pipeline guide assembly 10 to adopt a curvature in two dimensions, the pipeline guide assembly 10 may be connected to the vessel 13 via a rotational connection 70, such as a swivel. This swivel allows the stinger to rotate around the firing 24 line of the pipe lay system. With the one dimensional hingeable segments 20 and the swiveling pipeline guide assembly 10, a two dimensional adjustable system is obtained.

An advantage of this embodiment is that the construction of the stinger becomes simple.

It is possible to embody the pipeline guide assembly in a modular way, wherein the number of segments can be varied according to varying conditions, such as a varying pipe diameter or varying depth or other varying conditions.

Figure 10A:
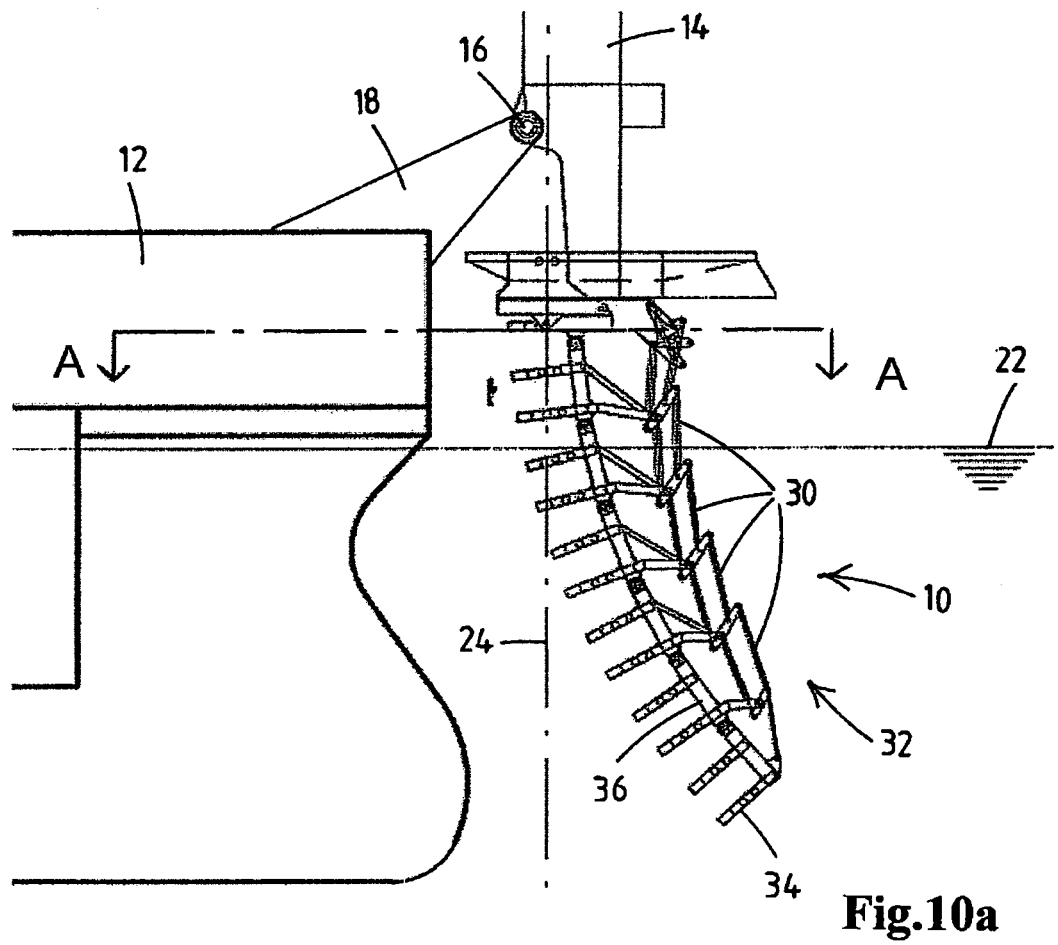
FIG. 10A shows a side view of another embodiment of the invention.
Figure 10B:
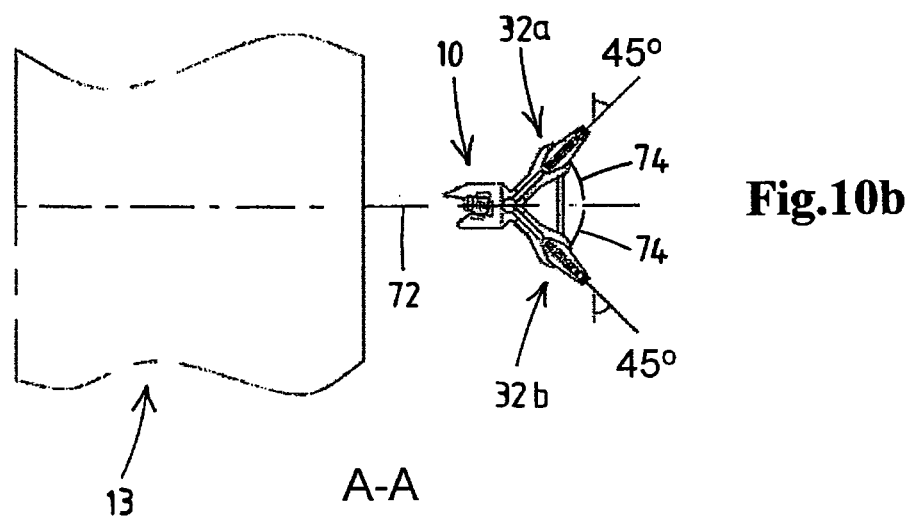
FIG. 10B shows a top view of the embodiment of FIG. 10A.

FIGS. 10a and 10b show another embodiment of the invention, wherein two curvature mechanisms 32A, 32 B are provided which are oriented differently relative to the vessel 13. As can be seen in FIG. 10b, the curvature mechanisms 32A, 32B are oriented at an angle 74 of 45 degrees relative to a central longitudinal plane 72 of the vessel 13.

In use, the two curvature mechanisms 32A, 32B may cooperate when providing a curvature of the pipeline 26 in the longitudinal plane. Both curvature mechanisms 32A, 32B may be actuated in order to provide the required curvature. Thus, in the case the pipeline is suspended along the longitudinal axis of the vessel (which in practice will often be the case) the forces exerted on each of the two curvature mechanisms 32A, 32B by the pipeline 26 will be lower than would be the case with the orientation of the curvature mechanism 32 according to the embodiment of FIGS. 1-3.

Although the vessel is equipped to lay pipelines omni-directionally, in some circumstances it is preferable to orient the vessel 13 relative to the pipeline in such a way, that the pipeline lies in the central longitudinal plane 72 of the vessel 13.

Figure 11:
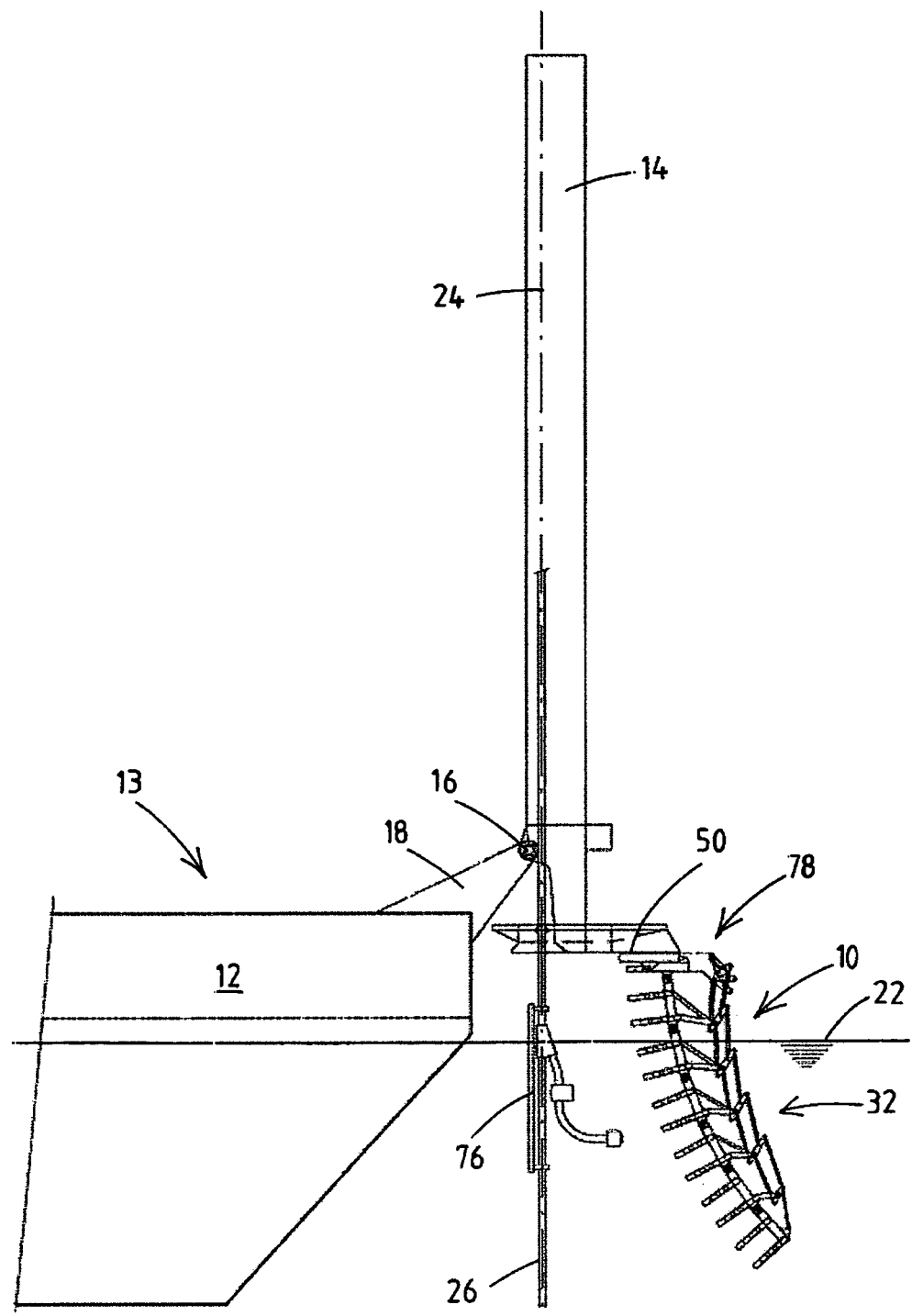
FIG. 11 shows a side view of another embodiment of the invention.

FIG. 11 shows that the pipeline guide assembly 10 may be retractable away from the firing line 24. To this end, a rail 50 may be provided along which the pipeline guide assembly 10 can be moved from an operating position near the firing line 24 and a non-operating position 78 remote from the firing line.

In use, the retraction of the pipeline guide assembly 10 creates space around the firing line 24 and allows an in-line structure 76 or an add-on structure or another bulky item to travel down the firing line 24 into the water. Thus, complete pipeline installations can be manufactured.

Figure 12:
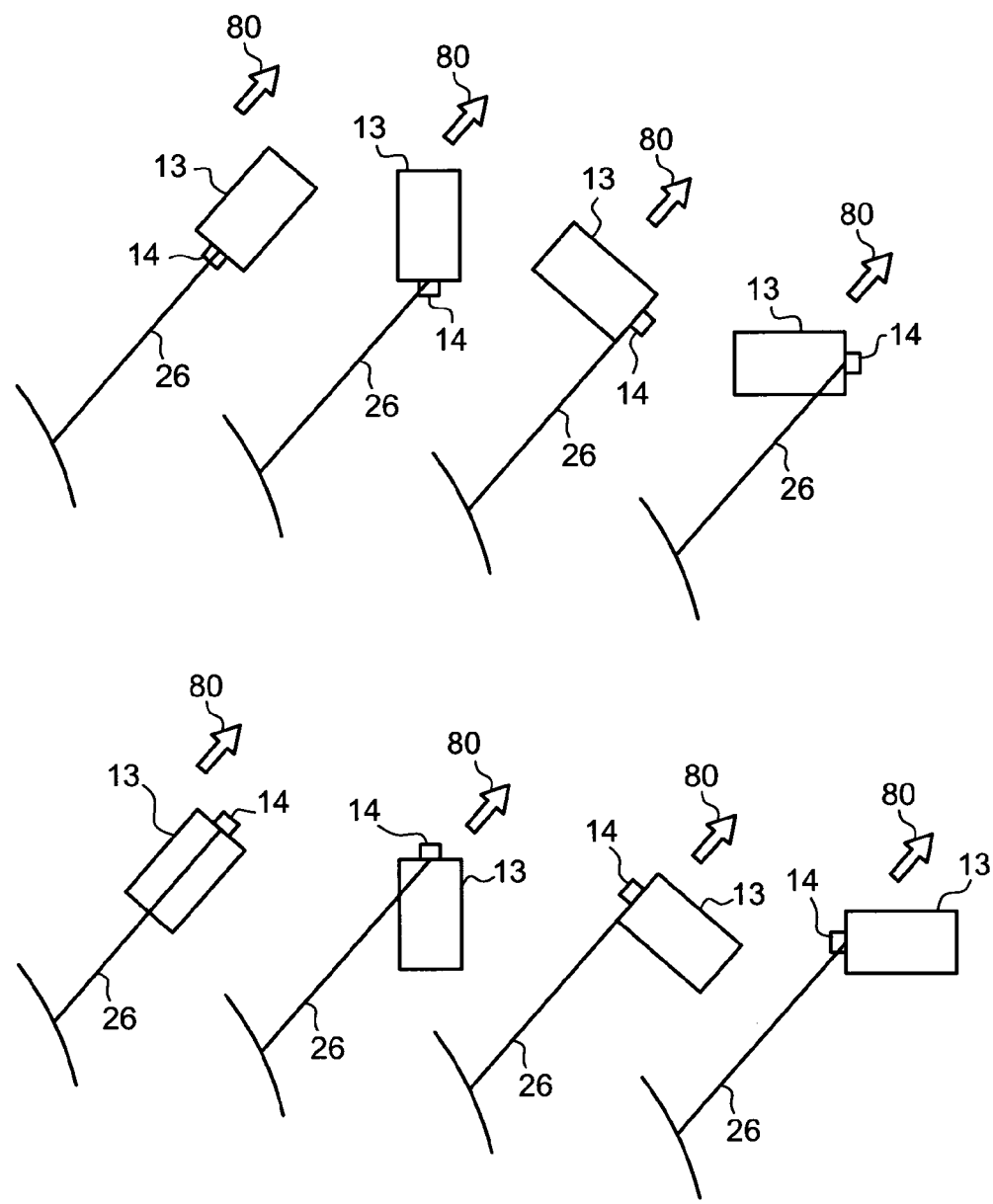
FIG. 12 shows a top view of a method of laying a pipeline according to the invention.

FIG. 12 shows that the vessel 13 can be oriented in any direction relative to the direction 80 in which the pipeline 26 which is laid. With the present invention, easy weathervaning is possible in order to align the vessel 13 with the angle at which wind and waves approach the vessel. This may lead to less movements of the vessel 13 during pipelaying, which significantly improves weld conditions. Another advantage of weathervaning is that the vessel can be positioned such that the propulsion system of the vessel can be optimally utilized to provide both station keeping and pipelay related thrust, which will lead to improved workability under unfavorable weather conditions. Thus, in an exemplary embodiment, a pipeline laying vessel 13 with omni-directional pipelaying capability is achieved, while at the same time allowing the J-lay tower to be oriented vertically.

A skilled person will understand that the above described stinger can be used for J-lay as well as S-lay and reel-lay systems.

It will be obvious to a person skilled in the art that numerous other changes in the details and the arrangement of the parts may be varied over considerable range without departing from the spirit of the invention and the scope of the claims.

The invention claimed is:

1. A pipeline guide assembly for a pipeline laying vessel, the pipeline guide assembly comprising:
   a plurality of segments pivotably interconnected via hinges in an end-to-end relationship, each segment comprising at least one pipeline support constructed to support a pipeline, wherein the pipeline supports of the segments provide a firing line along which a pipeline can be launched, and
   a curvature mechanism comprising at least one actuator, the curvature mechanism constructed for pivoting each segment relative to the next segment such that in use the segments provide a curved firing line, wherein the pipeline supports limit the curvature of the pipeline; and
   wherein the segments are pivotable relative to one another in a first plane and in a second plane, the first and second pivot plane being oriented at right angles to one another, such that the firing line can be curved in two independent planes.

2. The pipeline guide assembly of claim 1, wherein each segment comprises a main axis extending between a first hinge on one end of the segment and a second hinge on the second end of the segment, wherein the curvature mechanism comprises a connection assembly extending between a first connection point on a first segment and a second connection point on a second segment, wherein:

a) the first connection point is offset from the main axis of said first segment, and/or b) the second connection point is offset from the main axis of said second segment, and wherein the connection assembly is operable via the at least one actuator such that the first and second connection points are moved toward one another or away from one another, thereby pivoting the second segment relative to the first segment, the third segment relative to the second segment, and each next segment relative to the previous segment.

3. The pipeline guide assembly of claim 2, wherein a length of the connection assembly is variable via the at least one actuator.

4. The pipeline guide assembly of claim 2, wherein both the first and second connection point are offset from the main axis of the segment.

5. The pipeline guide assembly of claim 2, wherein a connection assembly between adjacent segments comprises a trapezoidal form, said trapezoidal form being connected to the first connection point on a first segment and to the second connection point on a second segment, wherein the at least one actuator is constructed and arranged to vary the form of the at least one trapezoidal shape, such that the first and second connection point are moved away from one another or are moved toward one another.

6. The pipeline guide assembly of claim 5, wherein a plurality of trapezoidal forms are provided, and wherein said trapezoidal forms are interconnected such that a deformation of a first trapezoidal form results in a deformation of a second, adjacent trapezoidal form, and wherein a deformation of the second trapezoidal form results in a deformation of a third trapezoidal form, and so forth, thereby pivoting the second segment relative to the first segment, the third segment relative to the second segment, and so forth.

7. The pipeline guide assembly of claim 5, wherein each connection assembly comprises:

a rocker beam pivotably connected to the connection point;

two link beams, each link beam pivotably connected at one end to the rocker beam and pivotably connected at the opposite end to a rocker beam of a next segment, wherein the two rocker beams and the two link beams form a trapezoidal form, and wherein a pivoting of a rocker beam of a first segment results in:

a) a pivoting movement of the rocker beam of a next segment and b) in a relative movement of the connection point of the first segment and the connection point of the next segment, thereby pivoting the next segment relative to the first segment.

8. The pipeline guide assembly of claim 1, wherein each segment comprises a main beam extending between a first hinge and a second hinge provided on either end of said main beam, wherein each segment comprises at least one offset beam projecting substantially laterally from the main beam, wherein said curvature mechanism is connected to said at least one offset beam at a connection point which is offset from a main axis defined between said first and second hinge.

9. The pipeline guide assembly of claim 8, wherein said main beam and offset beam are embodied as a strut and/or a truss.

10. The pipeline guide assembly of claim 1, wherein a single actuator is provided at an end of the pipeline guide assembly which is to be connected to the vessel, and wherein the curvature mechanism is constructed such that each segment is pivotable relative to a previous segment via the single actuator.

11. The pipeline guide assembly of claim 1, wherein the curvature mechanism comprises a plurality of connection assemblies which are constructed to transfer an actuating operation of an actuator from a first connection assembly to a next connection assembly, thereby allowing an actuating operation of the actuator to progress along substantially the entire pipeline guide assembly.

12. The pipeline guide assembly of claim 1, wherein the curvature mechanism comprises a plurality of actuators, allowing individual control of the pivoting of respective segments relative to one another.

13. The pipeline guide assembly of claim 1, further comprising a first curvature mechanism for curving the pipeline guide assembly in the first plane and a separate second curvature mechanism for curving the pipeline guide assembly in the second plane, the first and second curvature mechanism being operable independently from one another.

14. The pipeline guide assembly of claim 1, wherein the at least one actuator comprises an electrical drive, a hydraulic system, a pneumatic system, one or more spindles, a rack and pinion and/or of a spring system.

15. The pipeline laying vessel comprising the pipeline guide assembly of claim 1.

16. The pipeline laying vessel of claim 15, wherein the pipeline guide assembly is connected to the vessel via a rotational connection which is configured to allow rotation of the pipeline guide assembly about the firing line.

17. A method of laying a pipeline, the method comprising:

providing a pipeline laying vessel comprising a pipeline guide assembly comprising:

a plurality of segments pivotably interconnected via hinges in an end-to-end relationship, each segment comprising at least one pipeline support constructed to support a pipeline, wherein the pipeline supports of the segments provide a firing line along which a pipeline can be launched, a curvature mechanism comprising at least one actuator, the curvature mechanism constructed for pivoting each segment relative to the next segment such that in use the segments provide a substantially curved firing line, wherein the pipeline supports limit the curvature of the pipeline, actuating the curvature mechanism with the at least one actuator in order to provide a curved firing line, launching a pipeline from the vessel, wherein the pipeline is launched along the curved firing line; and curving the pipeline in a first plane by a first curvature mechanism and in a second plane by a second curvature mechanism.

18. The method according to claim 17, wherein the first and second plane are oriented at right angles to one another.

19. The method according to claim 17, wherein during the laying of the pipeline a central longitudinal plane of the pipeline laying vessel is oriented at an angle to the direction of the pipeline trajectory, the angle being substantially different than 0 or 180 degrees.

20. The method according to claim 17, wherein the vessel comprises a tower defining a part of the firing line above the pipeline guide assembly, and wherein said part of the firing line is oriented substantially vertically.

* * * * *